United States Patent
Harada

(10) Patent No.: US 6,379,579 B1
(45) Date of Patent: Apr. 30, 2002

(54) METHOD FOR THE PREPARATION OF SOFT MAGNETIC FERRITE POWDER AND METHOD FOR THE PRODUCTION OF LAMINATED CHIP INDUCTOR

(75) Inventor: Hiroshi Harada, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/520,333

(22) Filed: Mar. 7, 2000

(30) Foreign Application Priority Data

Mar. 9, 1999 (JP) ............................................ 11-061869

(51) Int. Cl.⁷ ............................. B28B 13/00; H01R 1/34
(52) U.S. Cl. .................. 252/62.6; 252/62.62; 264/427; 264/428; 264/611; 264/612; 427/127; 427/128; 427/129; 427/130; 427/131
(58) Field of Search ............................ 252/62.6, 62.62; 264/427, 428, 611, 612; 427/127, 128, 129, 130, 131

(56) References Cited

U.S. PATENT DOCUMENTS

| | | | | |
|---|---|---|---|---|
| 4,267,065 A | * | 5/1981 | Johnson, Jr. et al. | .... 252/62.62 |
| 5,476,728 A | * | 12/1995 | Nakano et al. | .......... 252/62.62 |
| 5,951,837 A | * | 9/1999 | Taguchi et al. | ............. 264/427 |
| 6,033,593 A | * | 3/2000 | Onizuka et al. | ......... 252/62.62 |

FOREIGN PATENT DOCUMENTS

| | | |
|---|---|---|
| JP | 5-175032 | 7/1993 |
| JP | 6-30297 | 4/1994 |
| JP | 9-314539 A | * 12/1997 |

* cited by examiner

Primary Examiner—C. Melissa Koslow
(74) Attorney, Agent, or Firm—Oblon, Spivak, McClelland, Maier & Neustadt, P.C.

(57) ABSTRACT

Provided are a method for preparing an Ni—Cu—Zn ferrite powder having excellent sinterability at a lower temperature, and a method for producing a laminated chip inductor from the above ferrite powder. The method for preparing the ferrite powder is a method for the preparation of a soft magnetic ferrite powder composed of Fe, Ni, Cu and Zn as main components, and comprises the step of allowing an organic additive to be present in a slurry containing a calcined product of a starting powder and water, wherein the organic additive is an organic compound having a hydroxyl group and a carboxyl group or a neutralization salt or lactone thereof, or the organic additive is an organic compound having a hydroxymethylcarbonyl group, an organic compound having an enol type hydroxyl group dissociable as an acid or a salt thereof.

7 Claims, 3 Drawing Sheets

—◆— COMPARATIVE EXAMPLE 1
—■— EXAMPLE 1
—▲— EXAMPLE 2
—×— EXAMPLE 3
—✶— EXAMPLE 4
—●— EXAMPLE 5

- ◆ COMPARATIVE EXAMPLE 1
- ■ EXAMPLE 1
- ▲ EXAMPLE 2
- ✕ EXAMPLE 3
- ✳ EXAMPLE 4
- ● EXAMPLE 5

METHOD FOR THE PREPARATION OF SOFT MAGNETIC FERRITE POWDER AND METHOD FOR THE PRODUCTION OF LAMINATED CHIP INDUCTOR

BACKGROUND OF THE INVENTION

1. Field of the Invention

The present invention relates to a method for the preparation of a soft magnetic ferrite powder sinterable at a low temperature and a method for the production of a laminated chip inductor from the soft magnetic ferrite powder produced by the above method.

2. Prior Art

In recent years, technologies for decreasing electronic machines and equipment in size and weight are remarkably developing, and various devices are accordingly being rapidly adapted to surface mounting. As an inductor device in particular, a so-called chip inductor formed by integrating a magnetic material and a coil is used in many cases, and it is desired to improve its performances.

For a chip inductor, generally, an Ni—Cu—Zn ferrite which is an oxide magnetic material is used as a magnetic material, and Ag or an Ag—Pd alloy is used as a conductive material for a coil.

In the production of a chip inductor, first, starting compounds containing Fe, Ni, Cu and Zn, respectively, are mixed, for example, with a ball mill, then, the mixture is calcined, and a calcined product is pulverized to obtain a soft magnetic ferrite powder. The soft magnetic ferrite powder is kneaded together with a binder and a solvent, to obtain a magnetic material paste. Further, a conductive material powder is kneaded together with a binder and a solvent, to obtain a conductive material paste. Then, these pastes are printed repeatedly to laminate magnetic material layers and conductive material layers, then, the so-prepared laminate is fired, and further, an external electrode is formed, whereby a chip inductor is obtained.

Meanwhile, for achieving high performances of a chip inductor, essentially, the ferrite is sufficiently densified and, further, it causes no reaction with the conductive material. Further, the conductive material is not caused to have failures such as line breaking. As a conductive material, it is preferred to use Ag as a simple substance due to its low electric resistance, while Ag has a melting point of as low as 960° C. For achieving high performances without causing any reaction between the conductive material and the ferrite and any line breaking, peeling, etc., of the conductive material, preferably, the firing is carried out at a temperature which is lower than the melting point of Ag and which is as low as possible, e.g., a temperature of 920° C. or lower.

However, it has been already pointed out that when an Ni—Cu—Zn ferrite powder is fired at a temperature of 920° C. or lower, the densification of the ferrite does not well proceed so that it is difficult to obtain a ferrite sintered body excellent in electric properties such as magnetic permeability.

A method for the production of an Ni—Cu—Zn ferrite sintered body is disclosed, for example, in JP-A-5-175032 to the present Applicant. The above Publication describes that the ferrite sintered body is improved in density by firing a ferrite material in an atmosphere having a lower oxygen concentration than air. In Example(s), the firing is carried out at 870° C. Further, JP-B-6-30297 to the present Applicant describes the following. When $Li_2O$ and an oxide of a tetravalent metal ($M^4$) (in which $M^4$ stands for at least one metal selected from titanium, tin or germanium) are added to a main composition containing iron oxide and an oxide of a divalent metal ($M^2$) (in which $M^2$ stands for nickel and/or copper or a combination of nickel and/or copper with zinc), the firing can be carried out at a low temperature, a temperature of 950° C. or lower.

However, nothing has been so far proposed concerning the method of enabling the firing at a low temperature without controlling any one of an atmosphere and a composition.

SUMMARY OF THE INVENTION

It is an object of the present invention to provide a method for the preparation of a soft ferrite magnetic powder, which method enables the production of an Ni—Cu—Zn ferrite powder having excellent sinterability at a low temperature, and a method for the production of a laminated chip inductor, in which the above ferrite powder is used so that the firing can be carried out at a low temperature to produce a laminated chip inductor.

The above objects are achieved by the present invention recited in the following constitutions.

(1) A method for the preparation of a soft magnetic ferrite powder composed of Fe, Ni, Cu and Zn as main components, the method comprising the step of allowing an organic additive to be present in a slurry containing a calcined product of a starting powder and water, wherein the organic additive is an organic compound having a hydroxyl group and a carboxyl group or a neutralized salt thereof or lactone thereof, or the organic additive is an organic compound having a hydroxymethylcarbonyl group, an organic compound having an enol type hydroxyl group dissociable as an acid or a neutralized salt thereof.

(2) A method according to the above (1), wherein the organic additive is added in an amount of 0.05 to 3.0% by weight based on the calcined product.

(3) A method according to the above (1) or (2), wherein the slurry contains Fe ion and Cu ion derived from said calcined product and has an Fe ion and Cu ion total content of 0.005 to 2% by weight based on the calcined product.

(4) A method according to any one of the above (1) to (3), wherein the organic compound having a hydroxyl group and a carboxyl group is gluconic acid or citric acid.

(5) A method according to any one of the above (1) to (3), wherein the organic compound having an enol type hydroxyl group dissociable as an acid is ascorbic acid.

(6) A method according to any one of the above (1) to (5), wherein the slurry contains ammonia. (7) A method for the production of a laminated chip inductor, which comprises the step of forming a magnetic layer from the soft magnetic ferrite powder produce by any one of the methods recited in the above (1) to (6).

DETAILED DESCRIPTION OF THE INVENTION

Figure 1:
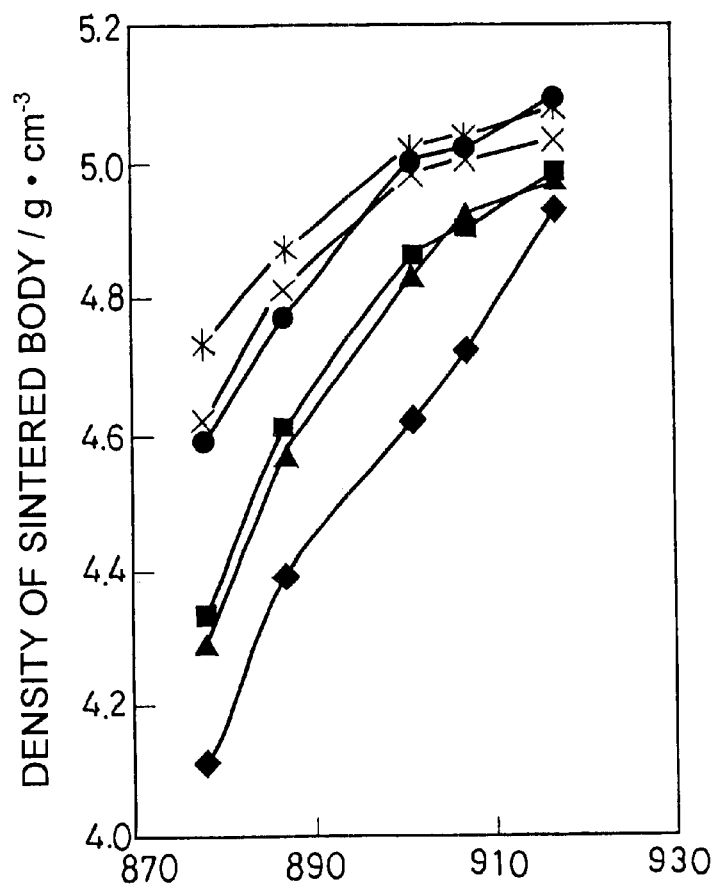
FIG. 1 is a graph showing a relationship between a firing temperature and a density of a sintered body with regard to an Ni—Cu—Zn ferrite sintered body.

The present inventor has found that the sintering temperature of an Ni—Cu—Zn ferrite powder can be decreased by allowing the above additive to be present in a slurry when the ferrite powder is produced by wet-pulverizing a calcined product. Specifically, it has been found that a sintered body having a sufficient density and a sufficient initial magnetic permeability can be obtained even if the firing temperature is set at a temperature of 920° C. or lower at which the firing can be carried out concurrently with the formation of an Ag electrode.

It is not yet clear what mechanism works to enable the sintering at a low temperature when a calcined product of a ferrite and the above organic additive are co-present in a slurry. However, the present inventor has studied metal ion contents in the slurry and has found that the Cu ion content and the Fe ion content are intensely influenced depending upon the presence or absence of the above organic additive. Specifically, it has been found that when the total amount of Cu ion and Fe ion derived from a ferrite calcined product is finally 0.005 to 2% by weight based on the ferrite calcinded product, particularly, when the amount of each of the Cu ion and the Fe ion is 0.01 to 1.0% by weight, there is produced a clear effect that the ferrite can be sintered at a low temperature. On the basis of the above data, it can be assumed that the above metal ions eluted from a ferrite calcined product re-adhere to a finely pulverized calcined product and works as a sintering auxiliary so that the sintering can be carried out at a low temperature. When the total amount of the Cu ion and Fe ion is too small, it is difficult to carry out the sintering at a low temperature. For eluting ions in an amount over the above range, undesirably, it is required to use an extremely large amount of the organic additive. When the total amount of these ions is in the range not exceeding 2% by weight, the sintering at a low temperature is fully materialized as an effect produced by the ions.

In the present invention, ammonia may be added to the slurry in addition to the above organic additive, and in this case, the effect of the present invention is further improved.

Of organic additives used in the present invention, for example, tartaric acid, 1-ascorbic acid and citric acid are known as dispersing agents for improving shapability in a slurry casting shaping method ("Shaping of Fine Ceramic and Organic Material", pages 187–188, SAITO Katsuyoshi, issued by CMC). Further, sodium gluconate is known as a dispersing agent in concrete industries ("Chemistry of Dispersion and Aggregation", pages 92–95, MORIYAMA Noboru, issued by Sangyotosho). In these fields, the above organic additives are all used as dispersing agents.

Further, WO98/25278 proposes that the same organic additive as that used in the present invention be added to an aqueous slurry during pulverization when an oxide magnetic material is produced. In the above Publication, however, the above organic additive is used as a dispersing agent for improving an orientation when a magnetic field is oriented. Further, the above Publication describes a dispersing effect in a hexagonal ferrite magnet, but it describes no Example concerning a soft magnetic ferrite powder. It merely describes that the above additive is effective for the magnetic field orientation of an acicular soft magnetic ferrite. Further, the above Publication neither describes nor suggests anything concerning the fact that a soft magnetic ferrite powder can be sintered at a low temperature when the ferrite is produced in the presence of the above organic additive.

In contrast, the present invention produces an unknown novel effect by adding the above organic additive to an aqueous slurry of a soft magnetic ferrite. In addition, experiments carried out by the present inventor have shown that the time period required for pulverizing a calcined product of a soft magnetic ferrite (pulverization time period taken before a constant specific surface area is obtained) is substantially not decreased. It is therefore considered that the above organic additive shows no dispersing effect on a soft magnetic ferrite powder.

PREFERRED EMBODIMENTS OF THE INVENTION

The soft magnetic ferrite powder produced according to the present invention is composed of an Ni—Cu—Zn ferrite. In the present invention, sintering to form a dense sintered body at a low temperature can be carried out without relying on a composition of the ferrite. Therefore, the amount ratio of components of the Ni—Cu—Zn ferrite to which the present invention is applied is not specially limited. The above amount ratio can be properly determined within a general composition range depending upon required properties. When oxides as main components are shown as $Fe_2O_3$, NiO, CuO and ZnO, the general amount ratio of these components is for example, $Fe_2O_3$: 35–50 mol %

NiO: 4–50 mol %

CuO: 4–16 mol %, and

ZnO: 5–40 mol %.

That is, the present invention can be applied not only to a high-magnetic-permeability material having a large $Fe_2O_3$ content but also to a low-magnetic-permeability material having a small $Fe_2O_3$ content. The reason for imposing a limitation on the amounts of the oxides as main components is as follows. When the amount of $Fe_2O_3$ is too small, the formation of a non-magnetic phase increases, which causes an increase in loss. When the amount of $Fe_2O_3$ is too large, sinterability is extremely poor. When the amount of NiO is too small, a loss increases, and when the amount of NiO is too large, a ferrite is expensive. When the amount of CuO is too small, sinterability is poor, and when the amount of CuO is too large, the amount of NiO is relatively small, so that a loss increases. When the amount of ZnO is too small, magnetic permeability is low, and when the amount of ZnO is too large, a Curie temperature is too low.

The ferrite powder may contain other metal oxides as secondary components or inevitable components as required in addition to the above main oxides. The above "other metal oxides" include, for example, oxides of Co, W, Bi, Si, B, Mn, Zr, Ca, Ta, Mo, P, Y, Mg, and the like.

In the present invention, the soft magnetic ferrite powder is produced by a method to be explained below.

First, a calcined product of starting powders is prepared. As starting powders, there can be used various raw materials which are generally used for the production of an Ni—Cu—Zn ferrite, such as oxides or various compounds which form oxides when fired. Preferably, the calcining is carried out in an oxidizing atmosphere, generally, in air, the calcining temperature (temperature to be maintained) is generally 700 to 900° C., and the time period for the calcining (time period for maintaining the temperature) is generally 0.5 to 10 hours.

The so-prepared calcined product is mixed with water, to obtain a slurry for pulverization. The slurry for pulverization is wet-pulverized until the calcined product has a predetermined particle diameter or specific surface area, and then, the slurry is dried, to obtain a soft magnetic ferrite powder.

In the present invention, the organic additive is allowed to be present in the above slurry for pulverization. The organic additive may be added at any time before the pulverization, during the pulverization or after the pulverization. The effect of the present invention is produced so long as the organic additive is present in the slurry so that metal ions are eluted in the slurry.

The time period for the wet pulverization is not specially limited, and it can be determined as required depending upon various conditions such as pulverization means, such that the calcined product has an average particle diameter of approximately 0.4 to 2.0 μm or a specific surface area of approximately 3 to 11 $m^2/g$, preferably approximately 3 to 8 $m^2/g$. The pulverization means are not specially limited, and it is generally preferred to use a ball mill, attriter or a vibration mill. Meanwhile, for sintering at a low temperature, it is known that it is sufficient to pulverize a calcined product until it has a fine diameter. When a calcined product is strongly pulverized for a long period of time, a pulverization medium formed of zirconia balls or iron balls wears out, which causes a contamination problem of the calcined product. In contrast, the present invention enables sintering at a low temperature even if the pulverization is carried out to form relatively coarse particles to such an extent that the calcined product has an average particle diameter or a specific surface area in the above ranges. The calcined product is therefore rarely contaminated by the wearing of the pulverization medium, so that a ferrite having stable properties can be obtained.

The content of the calcined product in the slurry for pulverization, i.e., the concentration of solid components, is preferably 15 to 50% by weight, more preferably 25 to 35% by weight. When the concentration of solid components is too low, or when it is too high, pulverization efficiency is low and uniformity of the pulverization is low.

The organic additive will be explained below. The organic additive used in the present invention includes an organic compound having a hydroxyl group and a carboxyl group, a neutralized salt thereof, a lactone thereof, an organic compound having a hydroxymethylcarbonyl group, an organic compound having an enol type hydroxyl group dissociable as an acid and a neutralized salt thereof, and of these, a compound which works as an acid is preferred.

Each of the above organic compounds preferably has 3 to 20 carbon atoms, more preferably has 4 to 12 carbon atoms, and preferably, hydroxyl groups bond to at least 50% of carbon atoms other than any carbon atom which forms a double bond with an oxygen atom. However, the above ratio of hydroxyl groups bonding to carbon atoms applies to the above organic compounds and does not apply to the organic additive itself. For example, when a lactone of an organic compound having a hydroxyl group and a carboxyl group (hydroxycarboxylic acid) is used as an organic additive, the above limitation to the ratio of bonding hydroxyl groups applies not to the lactone but to the hydroxycarboxylic acid itself.

The basic structure of the above organic additive may be either one of linear and cyclic structures, and the above basic structure may be saturated or may contain an unsaturated bond.

As an organic additive, specifically, a hydroxycarboxylic acid or a neutralization salt or lactone thereof is preferred. Particularly preferred are gluconic acid (C=6; OH=5; COOH=1) or a neutralization salt or lactone thereof, lactobionic acid (C=12; OH=8; COOH=1), tartaric acid (C=4; OH=2, COOH=2) or neutralization salts of these, and glucoheptonic acid γ-lactone (C=7; OH=5). Of these, gluconic acid or a neutralization salt or lactone thereof is preferred since these have a high effect on improvements of properties in sintering at a low temperature and are also less expensive.

As an organic compound having a hydroxymethylcarbonyl, sorbose is preferred.

As an organic compound having an enol type hydroxyl group dissociable as an acid, ascorbic acid is preferred.

In the present invention, further, citric acid or a neutralization salt thereof may be used as an organic additive. Citric acid has a hydroxyl group and carboxyl groups but does not satisfy the condition that hydroxyl groups bond to at least 50% of carbon atoms other than any carbon atom which forms a double bond with an oxygen atom. However, citric acid produces the effect of the present invention.

Some of the above-described preferred organic additives have the following structures.

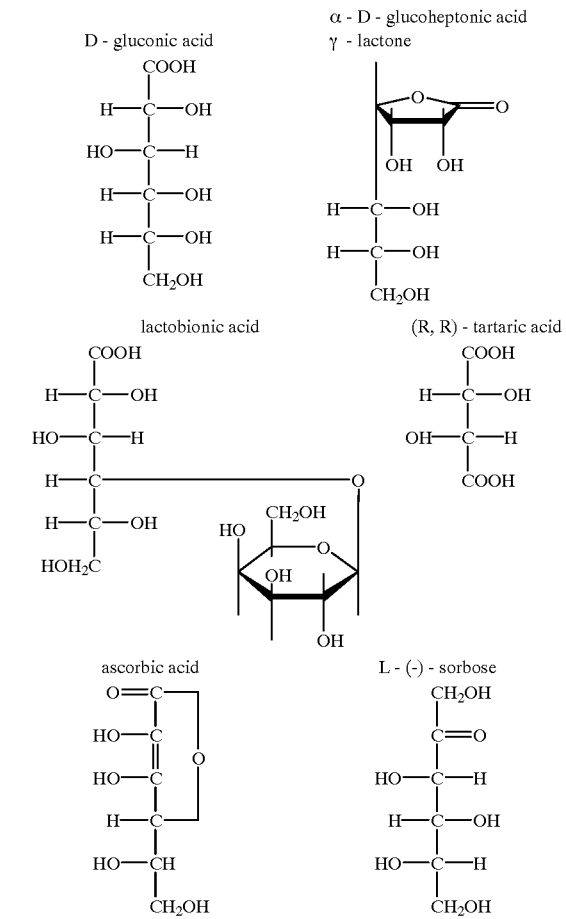

The above organic additives may be used alone or in combination.

The amount of the organic additive based on the clacined product is preferably 0.05 to 3.0% by weight, more preferably 0.10 to 2.0% by weight. When the amount of the organic additive is too small, the effect of the present invention is hardly produced. When the above amount is too large, a shaped body or a sintered body is liable to undergo cracking.

When the organic additive is an additive which is ionizable in an aqueous solution, such as an acid or a metal salt, the amount of the organic solvent refers to an amount thereof as an ion. That is, the amount of the organic additive is determined as an organic component excluding hydrogen ion and metal ions. When the organic additive is a hydrate, the amount is determined as an amount excluding water of crystallization.

Further, when the organic additive is a lactone or contains a lactone, the amount is determined as an amount of hydroxycarboxylate ion on the assumption that the lactone is all ring-closed to be converted to hydroxycarboxylic acid.

In the present invention, it is preferred to allow ammonia to be co-present in the slurry in addition to the organic additive. When ammonia is added, sintering at a lower temperature can be carried out, or a denser sintered body can be obtained when the firing temperature is the same. Ammonia can be added an aqueous ammonia. When ammonia is added, the ion amount, particularly, an Fe ion amount in the slurry tends to increase. When the amount of ammonia is too large, ion elution is sometimes inhibited contrary to intensions. It is therefore preferred to add ammonia in an amount of 5% by weight or less based on the calcined product. For achieving a sufficient effect produced by the addition of ammonia, it is preferred to add ammonia in an amount of at least 0.1% by weight based on the calcined product. Ammonia may be added at any time, before the pulverization, during the pulverization or after the pulverization. Generally, ammonia can be added concurrently with the organic additive.

The soft magnetic ferrite powder prepared by the above procedures can be applied to various fields, while it is particularly suitable for the production of a magnetic material core for various inductors. A magnetic material core of an inductor is produced by shaping a soft magnetic ferrite powder and firing a shaped body. The soft magnetic ferrite powder prepared according to the present invention can be fired in an oxidizing atmosphere, generally, in air. The firing temperature (temperature to be maintained) is generally 800 to 1,100° C., and the time period for the firing (time period for maintaining the temperature) is generally 1 to 6 hours. The soft magnetic ferrite powder prepared according to the present invention gives a magnetic material core having sufficient properties as such when fired at a temperature of 920° C. or lower. The soft magnetic ferrite powder prepared according to the present invention is therefore suitable for producing a laminated chip inductor for which it is required to carry out the firing concurrently with the formation of an Ag electrode. When a laminated chip inductor having an Ag electrode is produced, for thoroughly preventing the degradation of the properties of the ferrite caused by a reaction with Ag, it is preferred to set the firing temperature at 910° C. or lower, particularly at 900° C. or lower. The soft magnetic ferrite powder prepared according to the present invention gives a magnetic material core having sufficient properties as such even when fired at such a temperature.

A laminated chip inductor and a method for the production thereof will be explained hereinafter.

Figure 3:
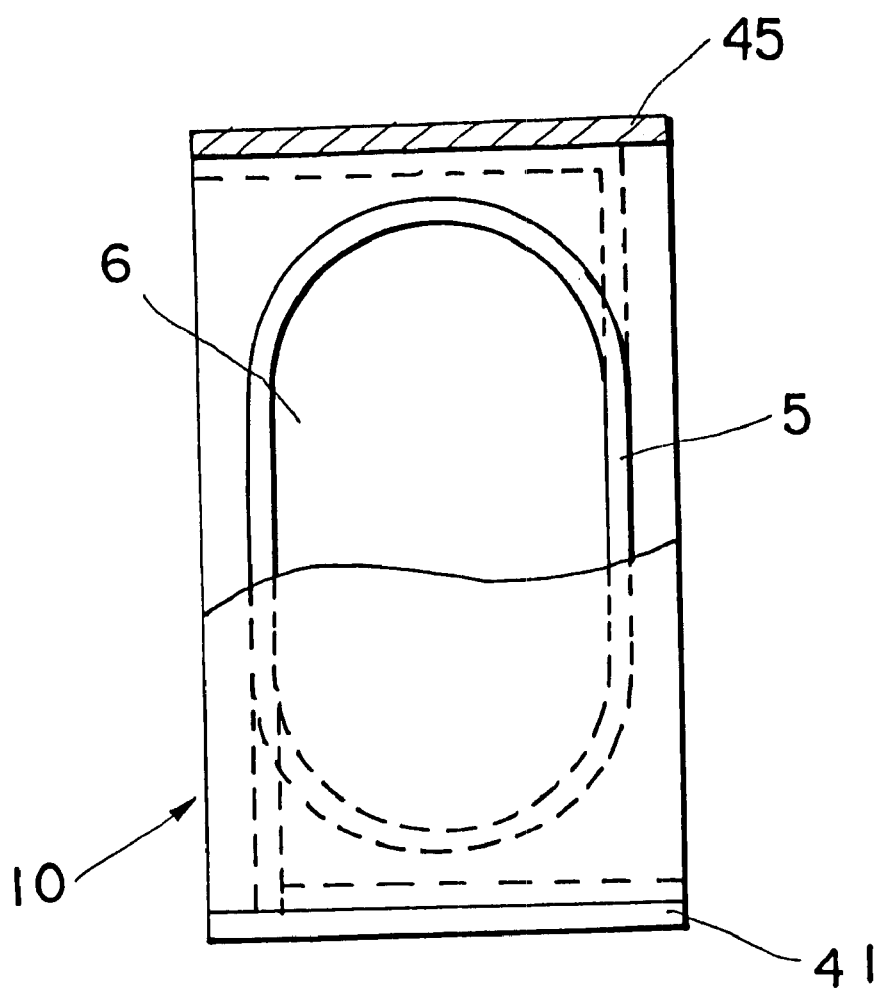
FIG. 3 is a partial plan view of a laminated chip inductor.

A laminated chip inductor shown in FIG. 3 has an inductor chip member 10 composed of a laminate of a magnetic layer 6 and an internal conductor 5 and external electrodes 41 and 45 formed on a surface of the inductor chip member 10.

The constitution of each portion of the laminated chip inductor can be selected from various known constitutions. For example, the laminated chip inductor is formed so as to have a nearly rectangular outer form. And, generally, the internal conductor 5 is helically arranged in the magnetic layer 6, to constitute an internal winding, and both ends thereof are connected to the external electrodes 41 and 45, as shown in FIG. 3. The external electrodes 41 and 45 may be formed as single electrode layers, while each of these may be provided with a coating layer formed of Cu, Ni, Sn or a solder. The coating layer improves solder wettability and heat durability against soldering. The winding pattern of the internal conductor 5 is not specially limited. The number of turns of windings can be properly determined depending upon a use. Generally, it is approximately 1.5 to 15.5 turns.

Dimensions of each portion of the laminated chip inductor are not specially limited, and they can be properly determined depending upon a use. For example, the magnetic layer has a thickness of approximately 20 to 100 $\mu$m. The external electrodes generally have a thickness of approximately 10 to 100 $\mu$m each. The total thickness of the external electrode and the coating layer is approximately 15 to 130 $\mu$m. While the width of each external electrode can be determined depending upon a purpose, each external electrode generally has a width of approximately 0.2 to 0.4 mm. The internal conductor 5 generally has a thickness of approximately 5 to 30 $\mu$m. While dimensions of the inductor chip member 10 can be determined depending upon a use, the inductor chip member 10 generally has dimensions of approximately (1.0 to 4.5 mm)×(0.5 to 3.2 mm)×(0.6 to 2.0 mm).

The internal conductor 5 contains a conductive material, and the conductive material preferably contains Ag, which has a small specific resistance, as a main component. The conductive material containing Ag as a main component preferably includes Ag and alloys of Ag—Pd, Ag—Pt and Ag—Pd—Pt. Ag is particularly preferred. Each Ag alloy preferably has an Ag content of at least 75% by mass.

The external electrodes 41 and 45 are preferably formed of a conductive material containing Ag as a main component. The conductive material containing Ag as a main component preferably includes Ag and alloys of Ag. Ag is particularly preferred. As Ag alloys, alloys of Ag—Pd and Ag—Cu are preferred, and of these, an alloy of Ag—Pd is preferred. Each Ag alloy preferably has an Ag content of at least 75% by mass. The external electrode may contain various glasses such as lead borosilicate glass.

For the production of the laminated chip inductor, first, a magnetic material paste, a paste for the internal conductor and a paste for the external electrodes are prepared.

The magnetic material paste can be prepared by kneading the soft magnetic ferrite powder prepared according to the present invention and an organic vehicle. The organic vehicle refers to a solution of a binder in an organic solvent. The binder for the organic vehicle is not specially limited, and it can be properly selected from various general binders such as ethyl cellulose, polyvinyl butyral, and the like. Further, the organic solvent is not specially limited, and it can be properly selected from various organic solvents such as terpineol, butyl carbitol, acetone, toluene, etc., depending upon a technique such as a printing technique or a sheeting technique. The magnetic material paste in the form of a water-based coating composition can be prepared by kneading an aqueous vehicle prepared by dissolving a water-soluble binder, a dispersing agent, etc., in water and the soft magnetic ferrite powder. The water-soluble binder in the aqueous vehicle is not specially limited, and it can be selected, for example, from polyvinyl alcohol, cellulose, a water-soluble acrylic resin, or the like.

The paste for the internal conductor can be prepared by kneading either the above conductive material or various oxides which are to form the above conductive material when fired, an organic metal compound and a resinate together with the above vehicle.

The paste for the external electrodes can be prepared in the same manner as the above paste for the internal conductor.

When the laminated chip inductor is produced by a printing technique, first, the magnetic material paste and the paste for the internal conductor are alternately printed on a substrate formed of a PET film, or the like, such that the paste for the internal conductor forms a coil pattern. Then, the so-prepared laminate is cut so as to have a predetermined form and predetermined dimensions, whereby a green chip is formed. Then, the green chip is separated from the substrate. When the laminated chip inductor is produced by a sheeting technique, first, a green sheet is formed from the magnetic material paste, and a through hole for conduction is made in the green sheet. Then, the paste for the internal conductor is laminated on the green sheet by printing, and the resultant laminate is cut, to obtain a green chip. In each technique, the green chip is fired to obtain an inductor chip member, and the paste for the external electrodes is printed or transferred to the inductor chip member and fired to obtain a laminated chip inductor. As conditions of firing the paste for the external electrodes, for example, the paste is fired at 600 to 800° C. for approximately 10 minutes to 1 hour.

The so-produced laminated chip inductor is mounted on a printed wiring board by soldering, etc., and the printed wiring board with the laminated chip inductor mounted on it is used in various electronic machines and equipment.

The soft magnetic ferrite powder prepared according to the present invention can be applied not only to a laminated chip inductor but also to various chip parts having a laminated chip inductor, such as an IC composite part.

EXAMPLES

Examples 1–5

$Fe_2O_3$: 49 mol %

NiO: 18 mol %

CuO: 12 mol %

ZnO: 21 mol %

The above oxides were weighed such that they had the above ratio, and they were wet-mixed in the presence of pure water as a dispersing medium with a wet media stirring pulverizer for 4 hours.

Then, the so-prepared mixture was dried with a spray dryer and clacined at 700° C. for 2 hours, to obtain a calcined product of an Ni—Cu—Zn ferrite.

The above calcined product was mixed with pure water, to obtain a slurry for pulverization. The slurry had a solid (calcined product) concentration of 25% by weight. Further, as shown in Table 1, an organic additive was added to the slurry, or an organic additive and ammonia were added to the slurry. The ammonia was added as aqueous ammonia having a concentration of 50% by weight. The amount of the additive or the amounts of the additive and the ammonia in each Example shown in Table 1 refer(s) to amount(s) based on the calcined product.

The above slurry for pulverization was pulverized with a wet media stirring pulverizer for 7 hours and then dried with a spray dryer, to give an Ni—Cu—Zn ferrite powder. The ferrite powder obtained by the above pulverization had a specific surface area of 4.4 m²/g (average particle diameter 1.4 μm). After the pulverization, the slurry was measured for metal ions by an ICP emission spectroscopy to determine weight ratios of Cu ion and Fe ion on the basis of the calcined product. Table 1 shows the results.

TABLE 1

|  | Organic additive | Amount of organic additive (wt %) | Amount of ammonia (wt %) | Fe ion (wt %) | Cu ion (wt %) |
| --- | --- | --- | --- | --- | --- |
| Ex. 1 | Gluconic acid | 0.5 | — | 0.06 | 0.08 |
| Ex. 2 | Citric acid | 0.25 | — | 0.08 | 0.07 |
| Ex. 3 | Gluconic acid | 0.5 | 1.0 | 0.07 | 0.09 |
| Ex. 4 | Copper gluconate | 0.25 | 1.0 | 0.06 | 0.12 |
| Ex. 5 | Ascorbic acid | 0.25 | 1.0 | 0.04 | 0.30 |

1.0 Gram of polyvinyl alcohol was added to, and mixed with, 100 g of the above ferrite powder, to form granules, and the granules were press-molded under a pressure of 98 MPa (1,000 kgf/cm²), to obtain a shaped body having the form of a ring having a diameter of 21 mm. The shaped body was fired by maintaining it at temperatures shown in FIGS. 1 and 2 for 2 hours, to give an Ni—Cu—Zn ferrite sintered body.

Figure 2:
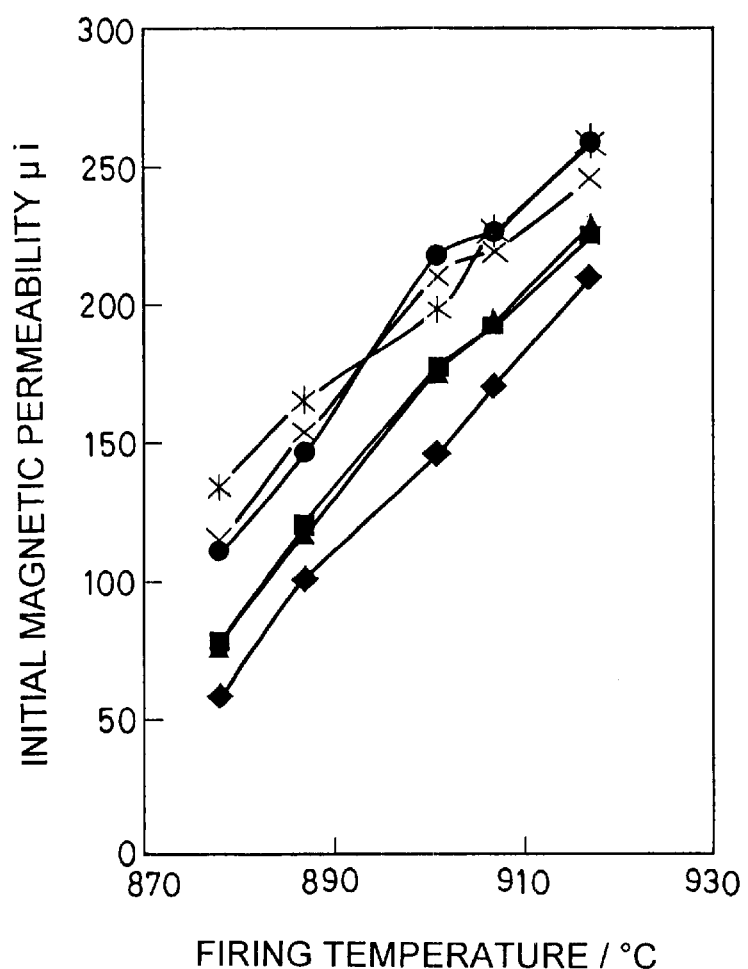
FIG. 2 is a graph showing a relationship between a firing temperature and an initial magnetic permeability of a sintered body with regard to the Ni—Cu—Zn ferrite sintered body.

The above sintered body was measured for a density according to an Archimedean method. Further, the sintered body was measured for an initial magnetic permeability at 100 kHz with an LCR Meter 4274A (supplied by Hewlett Packard). FIG. 1 shows a relationship between firing temperature and density, and FIG. 2 shows a relationship between firing temperature and initial magnetic permeability.

Comparative Example 1

A sintered body was prepared in the same manner as in the above Examples except that neither an organic additive nor ammonia was added to a slurry for pulverization. The sintered body was measured for a density and an initial magnetic permeability in the same manner as in the above Examples. FIGS. 1 and 2 show the results. The slurry was measured for ion contents in the same manner as in the above Examples, while neither Cu ion nor Fe ion was detected.

Evaluations

FIGS. 1 and 2 clearly show the effect of the present invention. That is, in of Examples 1 to 5 in which the organic additive was added to the slurries during the wet pulverization step for preparing the soft magnetic ferrites, the obtained sintered bodies had a sufficient density of at least 4.8 g/cm³ and a sufficient initial magnetic permeability of over 150 even when the firing temperature was set at a temperature of as low as approximately 900° C. In Comparative Example 1 in which no organic additive was added, the density and initial magnetic permeability of the sintered body obtained by firing at a low temperature were extremely poor as compared with those of the sintered bodies in Examples 1 to 5.

The soft magnetic ferrite powders prepared in the above Examples 1 to 5 were used as materials for magnetic layers, Ag was used as a material for an internal conductor, and laminated chip inductors were produced by a setting firing temperature at 910° C. In these cases, excellent inductor characteristics based on the properties shown in FIGS. 1 and 2 were obtained.

This application is based on Japanese patent application No. 11-61869 filed on Mar. 9, 1999, the content of which is incorporated hereinto by reference.

What is claimed is:

1. A method for the preparation of a Ni—Cu—Zn ferrite powder, the method comprising mixing an organic additive with water and a calcined product including a Ni—Cu—Zn ferrite to form a slurry; and drying the slurry to produce a soft magnetic ferrite powder including Fe, Ni, Cu and Zn as main components, wherein the organic additive is an organic compound having a hydroxyl group and a carboxyl group or a neutralized salt thereof or lactone thereof, or the organic additive is an organic compound having a hydroxymethylcarbonyl group, an organic compound having an enol type hydroxyl group dissociable as an acid or a neutralized salt thereof; and the slurry contains Fe ions and Cu ions derived from the calcined product and has an Fe ion and Cu ion total content of 0.005 to 2% by weight based on the calcined product.

2. The method of claim 1, wherein the slurry contains the organic additive in an amount of 0.05 to 3.0% by weight based on the calcined product.

3. The method of claim 1 or 2, wherein the organic compound having a hydroxyl group and a carboxyl group is gluconic acid or citric acid.

4. The method of claim 1 or 2, wherein the organic compound having an enol type hydroxyl group dissociable as an acid is ascorbic acid.

5. The method of claim 1 or 2, wherein the slurry contains ammonia.

6. The method of claim 1, further comprising wet-pulverizing the calcined product.

7. A method for the production of a laminated chip inductor, the method comprising mixing an organic additive with water and a calcined product including a Ni—Cu—Zn ferrite to form a slurry;

drying the slurry to produce a soft magnetic ferrite powder including Fe, Ni, Cu and Zn as main components;

forming a magnetic layer from the soft magnetic ferrite powder, wherein the organic additive is an organic compound having a hydroxyl group and a carboxyl group or a neutralized salt thereof or lactone thereof, or the organic additive is an organic compound having a hydroxymethylcarbonyl group, an organic compound having an enol type hydroxyl group dissociable as an acid or a neutralized salt thereof; and the slurry contains Fe ions and Cu ions derived from the calcined product and has an Fe ion and Cu ion total content of 0.005 to 2% by weight based on the calcined product.

* * * * *